Jan. 29, 1946. F. B. YINGLING 2,393,852
TWO CYCLE INTERNAL-COMBUSTION ENGINE
Filed Jan. 23, 1943 4 Sheets-Sheet 4

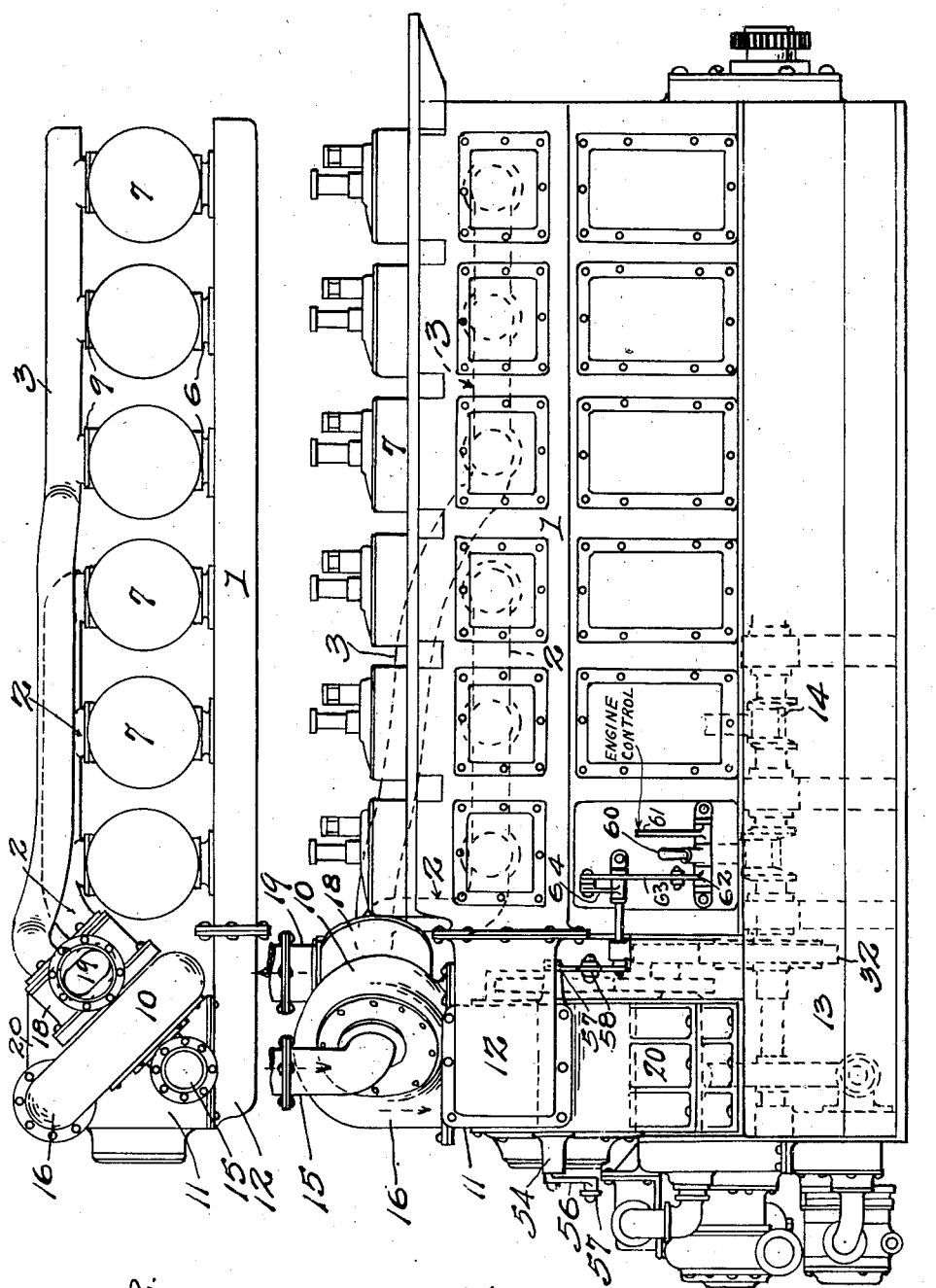

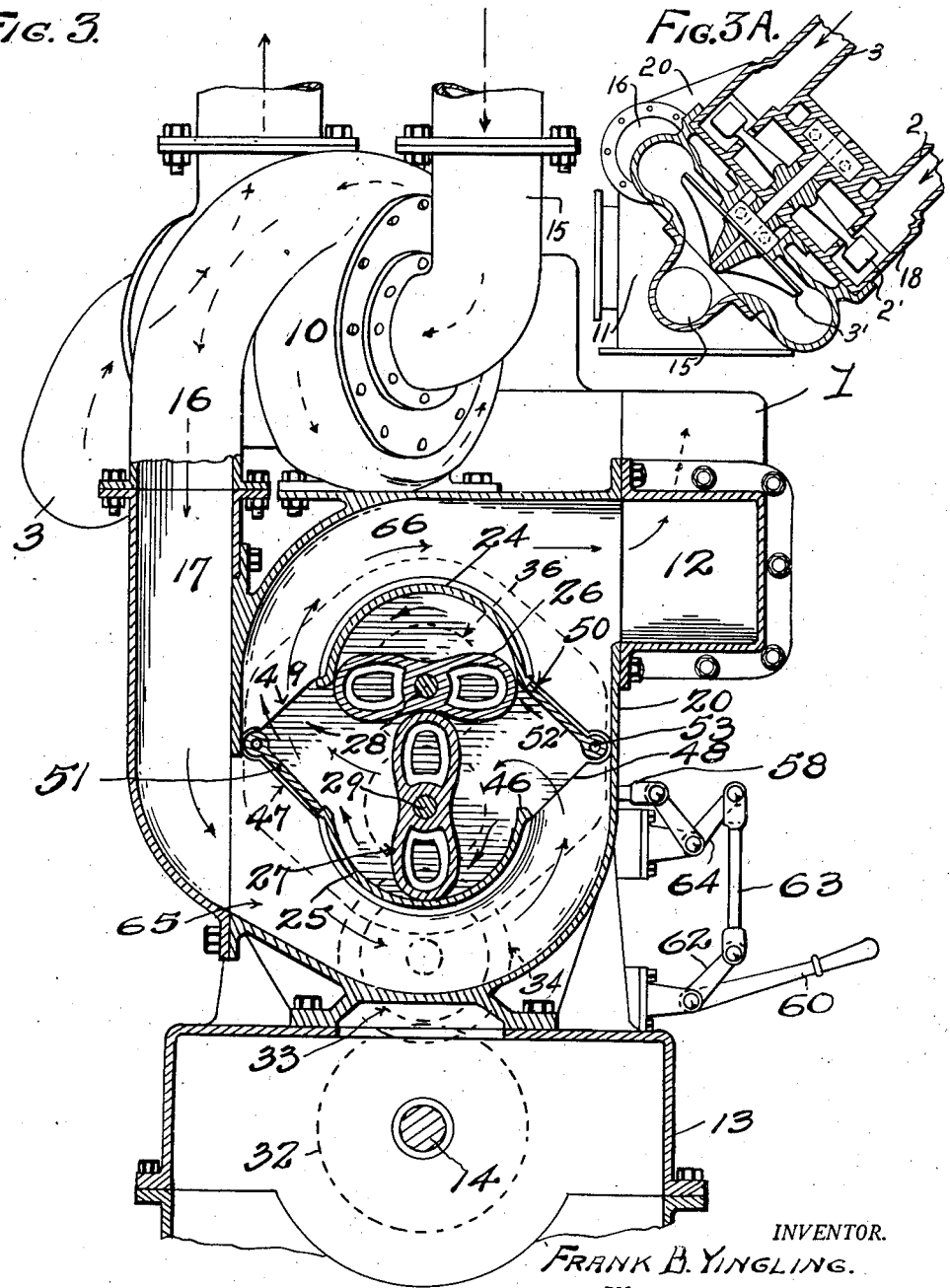

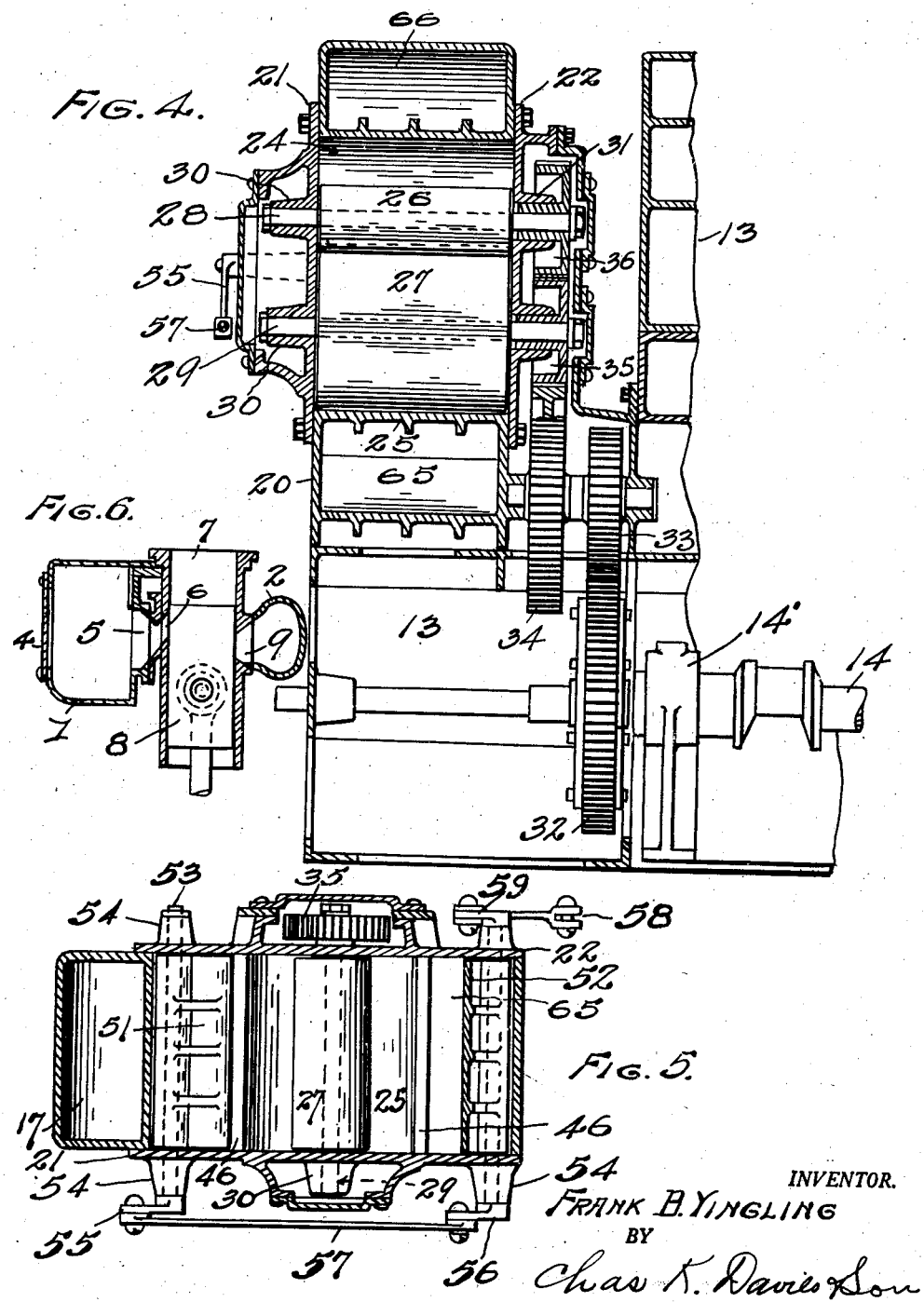

INVENTOR.
FRANK B. YINGLING
BY
Chas K. Davies Son

Patented Jan. 29, 1946

2,393,852

UNITED STATES PATENT OFFICE 2,393,852

TWO-CYCLE INTERNAL-COMBUSTION ENGINE

Frank B. Yingling, Hamilton, Ohio

Application January 23, 1943, Serial No. 473,290

13 Claims. (Cl. 123—41)

The invention relates to two cycle internal combustion engines of the multi-cylinder type having a single compressed air duct communicating with the intake ports of the in-line cylinders of the engine. The invention is embodied in a reversible engine having a reversible, positive displacement, rotary blower, preferably of the Roots type, driven by the engine for supplying air under pressure to the air duct which furnishes the air to the cylinders for both fuel and scavenging purposes. In combination with the positive displacement rotary blower I also utilize an exhaust turbo-supercharger operated by kinetic energy for supplying air under pressure to the rotary positive displacement blower.

The invention here involved is a continuation in part of my co-pending applications for patent Ser. No. 390,821 of April 28, 1941, and Ser. No. 411,560 of September 19, 1941; and in my co-pending application for patent Ser. No. 432,700 of February 27, 1942, I disclose heat responsive means for controlling the operation of the exhaust turbo-supercharger which forms part of the present invention.

By utilizing the reversible positive displacement rotary blower for furnishing air under pressure for both fuel and scavenging purposes to the cylinders of the engine, and supplementing this pressure by superimposing the air pressure produced from the kinetic energy in the exhaust turbo-supercharger, the pressure of fuel air and scavenging air in the single air-duct for the engine cylinders is substantially increased in an economical and efficient manner. Thus by utilizing the air pressure created or developed by the use of kinetic energy that would otherwise be lost, I achieve not only an increase in the horsepower of the engine of this type, but in addition I accomplish a saving of the engine power ordinarily required to operate the rotary positive displacement blower that is driven from the crank shaft of the engine.

The reversible rotary blower is capable of delivering a desired volume of fluid pressure when rotating in either forward or reverse direction, and control means are provided for changing the entry direction to, and flow of air currents through the blower, in accord with changes in the directional movement of the blower. The non-reversible exhaust turbo-supercharger which supplies, air under pressure to the engine operated blower, in addition to supplying the positive displacement blower, also transmits power, through fluid pressure, to the rotary blower, thereby relieving the engine by reducing the consumption of power developed thereby.

While the combined blowing apparatus of my invention is well adapted for various purposes, it is especially efficient and desirable for use in combination with the reversible internal combustion engine of the Diesel type in the process of charging compressed air to the cylinders of the engine for combustion purposes, as well as for scavenging purposes. A specific example of the utility of the improvements embodied in an engine constructed in accord with the present invention is the combination of parts especially adapted for marine installation and use. As is well known, the space aboard ship is limited, especially as to the width or beam of the ship, and in view of this limitation, the compact arrangement of parts of the engine, which is longitudinally disposed along the longitudinal axis, or in pairs parallel with the longitudinal axis of the ship, insures the occupation of only a minimum lateral displacement of space in the ship.

In carrying out my invention I employ the exhaust turbo-supercharger in position mounted directly upon and in compact relation to the rotary blower or compressor forming part of the engine, and the blower delivers air under suitable pressure to the single air-duct for the cylinders, regardless of the direction of rotation of the engine shaft. For this purpose the several cylinders of the engine are each provided with exhaust ports leading to the exhaust manifold or manifold-sections that are connected with the turbo-supercharger and which extend longitudinally along and in close relation to the engine at one side thereof. At the other side of the engine or cylinders in-line the cylinders are provided with air chambers and intake ports, and these chambers and ports are supplied with air under pressure from the single air duct that extends longitudinally of the engine and in close relation thereto.

Power for operating the positive displacement blower is transmitted from the engine shaft through a train of gears to the rotating members of the blower, and the direction of rotation of the train of gears is reversed, as when manoeuvering a ship, as the rotation of the engine shaft is reversed, to reverse the rotary movement of the blower. The train of gears is compactly arranged between the first cylinder and the rotary blower, within the lateral limits of the engine, and the driving wheel or gear of the train of gears has a flexible or resilient construction which eliminates shocks and strains that might otherwise be imparted to the gearing, when the engine is starting, and this flexible coupling also cushions the change of direction in transmission of power through the train of gears when the engine, the train of gears and the rotary positive displacement blower are reversed, in their movements.

For controlling the entry of air under pressure, from the exhaust turbo-supercharger, through the blower in accord with the direction of rotation of the blower, and for delivering air currents under pressure from the blower, a pair of adjustable valves are employed, one at each side of the blower, and each in connection with an intake valve and an outlet or discharge valve. The operation of the rotary blower is synchronized with the operation of the engine, and the adjustment of the valves to change the entry-direction of air currents to the blower is synchronized with the engine control mechanism, so that the valves are automatically positioned with the starting of the engine in either forward or reverse direction.

In the accompanying drawings I have illustrated one complete example of the physical embodiment of my invention involving the combination with the exhaust turbo-supercharger, a reversible positive displacement rotary blower and reversible power transmission mechanism between the reversible engine and the blower, automatic means actuated by the engine control means for reversing the directional flow of air through the blower, and the single air duct common to the cylinders of the engine for supplying the cylinders with air under pressure for both fuel and scavenging purposes. It will be understood, however, that changes and alterations may be made in the exemplifying drawings of this physical embodiment of my invention, within the scope of my claims, without departing from the principles of my invention.

In the assembly view of Figure 1 I have shown a six-cylinder Diesel type engine, the combination blower appliance of my invention combined with the engine at the front end thereof, and also showing the engine control station together with mechanical connections therefrom for synchronously controlling or adjusting the valves of the positive displacement rotary blower of the Roots type.

Figure 2 is a top plan view illustrating the compact relation of the combination blower appliance, the single air duct at one side of the engine, and the exhaust manifolds or manifold-sections for exhaust gas at the opposite side of the engine.

Figure 3 is an enlarged vertical sectional view of part of the engine showing the combination blower appliance, with the positive displacement blower in section and the exhaust turbo-supercharger mounted directly upon the Roots type blower.

Figure 3A is a detail sectional view in a horizontal plane of the exhaust turbo-supercharger as in Figure 2.

Figure 4 is a longitudinal, vertical sectional view at the front end of the engine showing the positive displacement rotary blower, and the train of gears from the engine shaft for operating the blower.

Figure 5 is a horizontal sectional view of the rotary blower showing the reversible valves and one of the rotors of the blower.

Figure 6 is a small transverse vertical sectional view showing a portion of one of the engine cylinders with its piston and ports, the air duct, and a portion of one of the exhaust manifold-sections.

Figure 9:
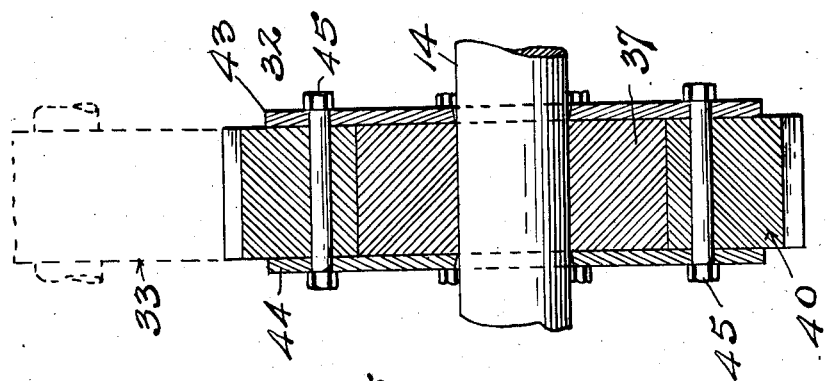
Figure 9 is a transverse sectional view at line 9—9 of Figure 7.

In the assembly view of Figure 1 I have shown so much of a multi-cylinder, two cycle, reversible, internal combustion engine of the compression or Diesel type as is necessary to illustrate my invention, and this engine is equipped with a single compressed air duct 1 shown in Figure 2 as extending longitudinally of the engine, at one side thereof, and closely related to the cylinders of the engine. At the opposite side of the engine, the exhaust manifold extends longitudinally in close relation thereto, and as here indicated the exhaust gases are preferably conveyed through two sectional manifolds, as 2 and 3, the number of sections employed depending upon the number of cylinders to the engine, and each sectional manifold serving a group of cylinders here shown as three.

In Figure 1 and in the detail sectional view Figure 6 it will be seen that the longitudinally extending single air duct 1 is provided with manhole plates 4 for holes in the wall of the duct located opposite air chambers 5, and the air chambers communicate through intake ports 6 with the in-line cylinders 7, so that the compressed air supplied through the single duct is conveyed to and used in the cylinder with the fuel, as well as for scavenging purposes. A conventional piston is indicated at 8, and the cylinder is shown as having an exhaust port 9 that communicates with one of the manifold-sections 2 or 3.

In Figures 1 and 2 the in-line cylinders 7 of the engine are all supplied with air under pressure from the combination blowing appliance which includes the turbo-supercharger 10 and the positive displacement rotary blower 11, both mounted adjacent an end cylinder within the lateral limits of the engine and forming integral parts of the engine. In their compact arrangement and direct connections, the Roots type blower is disposed transversely of the longitudinal axis of the engine and the exhaust turbo-supercharger as shown is mounted directly on the blower diagonally of the longitudinal axis of the engine, thereby conserving space, and by the close and compact arrangement of parts assuring efficiency in the production and distribution of air currents under pressure. The positive displacement rotary blower is connected directly to the single air duct 1 by means of a flanged delivery connection or casing 12, and the air duct is of ample capacity to receive and maintain the required volume of compressed air for fuel and for scavenging use.

Portions of the engine frame are indicated as 13, and the crank shaft 14 of the engine is supported in suitable main bearings, as 14' in the lower part of the engine frame or housing.

In Figures 1, 2, and 3A it will be seen that the exhaust turbo-supercharger indicated as a whole by the number 10, has an axial air-intake pipe 15, and its peripheral discharge pipe 16 opens to the intake pipe or passage 17 of the rotary blower 11. The operating means of the supercharger includes an exhaust-gas operated turbine-rotor 2' and its rotary air impeller 3', both mounted on the same shaft, but rotating respectively in an exhaust gas chamber and a separated air chamber of the supercharger, as best seen in Figure 3A. For operating the turbo-supercharger by kinetic energy from exhaust gas, the two manifold-sections 2 and 3 receive exhaust gas from three adjoining cylinders, and these sectional manifolds convey the exhaust gas to the operating housing 18 of the supercharger, from whence the exhaust gas finally is discharged as through the outlet pipe 19.

The reversible rotary blower, indicated as a whole by the number 11, includes a housing 20 having openings in its opposite side walls, and these side openings are closed by the use of exterior bearing plates or side plates 21 and 22, which also form frame portions that are fastened, as by bolts, to the opposite sides of the housing. Within the housing are provided two transversely extending, upper and lower, spaced concaves 24 and 25, here shown as semi-cylindrical in shape and mounted between the side walls of the housing to form part of an interior casing for the impellers or rotors 26 and 27 of the blower. These rotors or impellers 26 and 27 are synchronized to rotate in opposite directions so that their outer wings will sweep through their respective concaves to create the desired air blast, and their inner wings will co-operate to provide an air seal.

In Figure 3 the impeller 26 is rotating counter-clockwise and the impeller 27 is rotating clockwise, for causing a flow of air currents from the right end through the interior casing to the left end of the casing, as indicated by the arrows. It will be apparent that when the operation of the blower is reversed in accord with the reversal of the main shaft 14 of the engine, the rotary movements of the impellers are also reversed, causing the air blast to be directed from left to right through the impeller casing.

These rotary impellers, which are shown as having hollow wings, are mounted on their respective shafts 28 and 29, which have journal ends that project the sides of the casing, and their ends are journaled in suitable bearings fashioned as exterior bosses 30 on side plate 21, and bosses 31 on side plates 22 of the blower housing.

As best seen in Figure 4 the rotary impellers of the blower are synchronized for operation with the engine shaft 14, and power is transmitted from the shaft 14 to the blower through a train of gears indicated at 32, 33, 34, 35, and 36, the gear 32 being mounted on the engine shaft 14, and the last small gears 35 and 36 being mounted on the impeller shafts 29 and 28 respectively.

Figure 7:
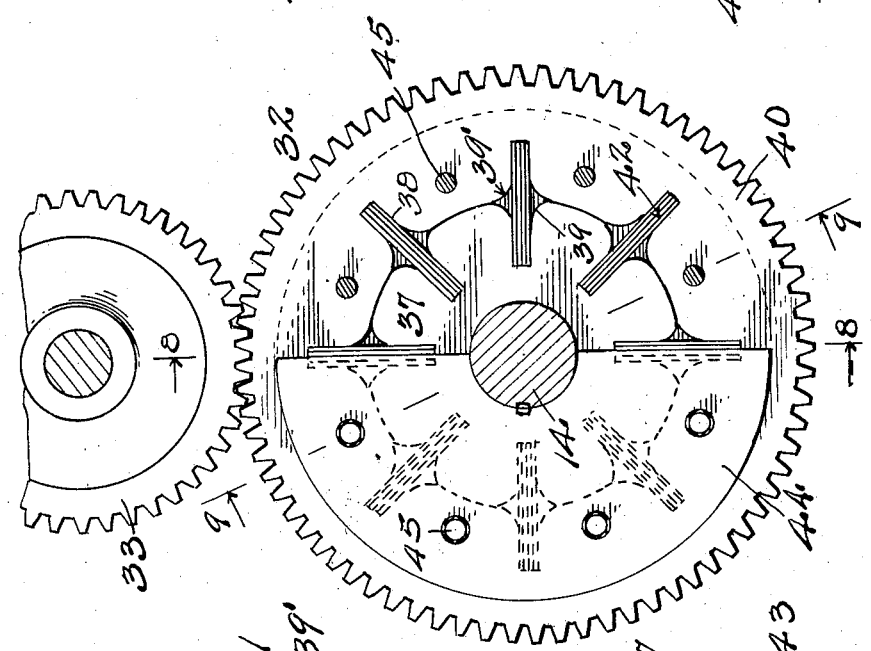
Figure 7 is a partial face view and partial sectional view of the resilient drive gear for the train of gears which operates the positive displacement rotary blower, one of the train of gears also being indicated.
Figure 8:
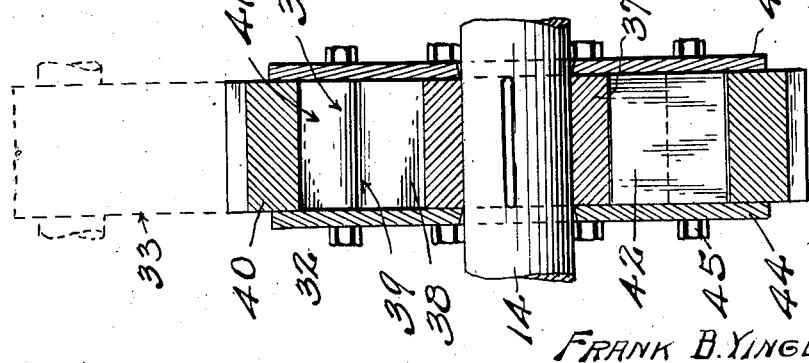
Figure 8 is a transverse sectional view at line 8—8 of Figure 7.

In the detail views Figures 7, 8, and 9. it will be seen that the gear 32 is a flexible, resilient gear, that performs the functions of a cushion between the shaft 14 of the engine and the train of gears which operates the impellers. This gear comprises a hub section 37 keyed on the crank shaft and fashioned with exterior circumferentially spaced radially extending sockets or open end slots 38 having outwardly flared or rounded ends 39. A gear ring, or toothed annulus 40 is mounted on the hub section and fashioned with complementary, interior, annular series of sockets 41 having flared ends 39' which register with the hub-sockets. For a flexible and resilient coupling between the inner hub section and the outer gear ring I employ a series of steel springs 42 fashioned from sets of laminated, flat plates, the ends of each spring being fitted within two registering sockets 38—41, so that the springs may be flexed in contact with the rounded or flared ends of the sockets.

To retain the gear-wheel sections and the series of springs in proper place I utilize two side-plates 43 and 44, and bolts 45, with complementary nuts, are passed through bolt-holes in the plates and in the gear-ring for clamping or fastening the parts together.

When starting, or in reversing the engine, the springs absorb the driving strain from the engine shaft thereby cushioning the transmission of power required to overcome inertia of the gear train and insuring a smooth initial operation of the blower.

In combination with the reversible impellers of the rotary positive displacement blower, means are employed for changing the directional-entry of air under pressure, from the turbo supercharger through intake 17, to and through the impeller casing, such means being preferably two pairs of air-control valves automatically operated or adjusted in co-operation with the engine control. For this purpose, and as best seen in Figures 3 and 5 the several edges of the two semi-cylindrical concaves 24 and 25 are fashioned with lips or flanges 46, 46 that provide seats along one edge of each of four ports 47, 48, 49, and 50, that are angularly disposed in pairs between the two concaves, and these ports extend from one open side to the other open side of the impeller casing. As indicated in Figure 3 ports 47 and 48 are alternately used as intake ports for air under pressure from the turbo-supercharger, and ports 49 and 50 are alternately used as outlet ports or discharge ports for air under pressure from the impellers of the blower.

In Figure 3 the lower right hand intake port 48 is shown in open relation to the interior of the impeller casing, and the upper left hand discharge or delivery port 49 is open for passage of air currents from the interior of the impeller casing. The lower left hand intake port 47 is closed by a flap valve 51, and the upper right hand discharge port 50 is closed by a complementary flap valve 52. Thus it will be apparent that one valve closes an intake port while the other valve closes a discharge port, and these jointly movable valves are so arranged that valve 51 will open port 47 and close port 49, and valve 52 will simultaneously open port 50 and close port 48, to change the directional entry and flow of air currents through the impeller casing when the rotary movements of the two impellers are reversed in accord with a reversal of the rotary movement of the engine shaft.

The valves 51 and 52 are simultaneously adjusted or shifted by and synchronized to operate with the engine-control mechanism usually located at the control station of the engine, and the valves are movable through approximately an angle of 90°. The valves are each provided with a hinge pin 53, 53, which pins pass through the side openings of the impeller casing, and as best seen in Figures 3 and 5, the ends of these pins are journaled in bearing bosses 54 mounted upon the exterior faces of the side plates 21 and 22 of the impeller casing. These hinge pins are provided with lever arms 55 and 56 that are pivotally connected by a link 57 at the front of the blower, and the arms and pins, with the valves, are moved simultaneously by a pull or push on a short operating link 58 that is pivoted to the lower free end of a lever arm 59 mounted on pin 53 of the valve 52.

As best seen in Figures 1 and 3 the valves are adjusted through a system of levers and links connected to the engine starting and reversing mechanism at the engine control station so that the adjustment of the valves is co-ordinated with the engine control lever. The engine-control for starting the engine for forward or reverse movement of the shaft 14 is indicated by a conventional hand lever 60 and connecting link 61 designated as "Engine control" in Figure 1. This manual control lever 60 is also connected with the short link 58 through an appropriate system of levers and links designated as 62 and 63, and bell crank lever 64 which is pivotally connected to the short link 58.

As best seen in Figures 3 and 5, the two intake ports 47 and 48 open outwardly to an intake chamber 65, and the two discharge ports 49 and 50 open outwardly into an outlet chamber or delivery chamber 66 of the blower; these respective chambers being shown within the housing, but exterior of and partially surrounding the enclosed impeller casing. The discharge chamber or pressure chamber 66 delivers the air under pressure directly to the interior of the connection or casing 12; and the intake chamber 65 receives air under pressure from the exhaust turbo-supercharger directly through the intake pipe 17.

It will be apparent that the air currents under pressure from the exhaust turbo-supercharger flow at all times in the same direction through the intake pipe 17 to the interior of the intake chamber 65, but the entry-direction of these air currents, flowing to the impeller casing, may be changed from one side of the impeller casing to the opposite side thereof, thus changing or reversing the flow of air currents under pressure through the impeller casing to the outlet chamber.

These changes in the directional entry to and flow of air currents through the impeller casing are co-ordinated with the engine control so that the valves are automatically adjusted from the engine control station.

While I have illustrated and described one combination and arrangement of the co-ordinated parts to disclose a complete physical embodiment of my invention, it will be understood that I do not limit my invention to this specific disclosure, which is well adapted for use in efficiently and constantly supplying air under pressure to marine engines. As is well known, such reversible marine engines employed for the propulsion of ships are usually reversed at infrequent intervals, as for instance in maneuvering to depart from port and when arriving at port. But in the construction and operation of the compactly arranged mobile parts of the engine, and in their control, the engine is constantly and at all times responsive to facile operation under control of the engineer.

By this utilization of the otherwise wasted kinetic energy of the exhaust gases to drive the first air compressor or turbo supercharger 10 and thereby supply compressed air to the positive displacement rotary blower 11, which rotary blower is normally driven from the crank shaft when starting the engine, power developed from the kinetic energy is also imparted to the crank shaft. When the kinetic energy of the exhaust gas develops sufficient volume and power in the turbo-supercharger to provide fluid pressure to the rotary blower the latter is directly driven by such fluid pressure so that the rotary blower now performs the functions of a motor transmitting power through the train of operating gears to the crank shaft.

Thus, when the engine is started, the power from the crank shaft is employed to start the train of gears and the rotary blower for charging the cylinders with compressed air for fuel purposes and for scavenging purposes, but after the engine is running and while the rotary blower continues to charge the cylinders, not only is engine power conserved, but on the other hand the volume of engine power available for use is increased due to the utilization of the kinetic energy operating in the turbo-supercharger.

In addition, the higher air pressure developed and charged into the cylinders by the use of the kinetic energy enhances the brake mean effective pressure and horsepower developed by the engine, and this increased efficiency is attained without the use of engine power for driving the rotary blower 11.

With the turbo-supercharger, under kinetic energy, operating at full efficiency and capacity, compressed air is supplied to the rotary blower 11 in intensity and volume to operate the blower as a motor, the pressure of air charged to the cylinders is automatically increased, and with complementary increase in the quantity of oil supplied to the mixture, the horsepower of the engine is enhanced from fifty to a hundred per cent as compared with normally operating two-cycle engines of this type, and with a corresponding decrease in the consumption of fuel per horsepower of the engine.

While my invention renders the engine especially applicable for marine use, changes and alterations may be made in the exemplifying drawings within the scope of my claims, in order that the engine may successfully and efficiently be employed in stationary power plants, and other power plants.

Having thus fully described my invention, what I claim as new and desire to secure by Letters Patent is:

1. The combination in a reversible two-cycle multi-cylinder engine having a single compressed air duct located at one side of and communicating with the engine cylinders, and an exhaust manifold located at the opposite side of and communicating with said cylinders, of a reversible positive displacement rotary blower communicating with the air duct, reversible power transmission mechanism between the engine and the blower, an exhaust turbo-supercharger mounted directly on and supplying air under pressure to the blower, engine control means, and operative connections between said engine control means and said power transmission mechanism.

2. The combination in a reversible two-cycle multi-cylinder engine having a single air duct located at one side of and communicating with the engine cylinders, and an exhaust manifold located on the opposite side of and communicating with said cylinders, of a reversible positive displacement rotary blower communicating with the air duct and engine-driven means for operating said blower, a turbo-supercharger receiving exhaust gas from said manifold mounted directly on and supplying air under pressure to said blower, engine control means, and means automatically actuated by the engine control means for changing the directional-entry and flow of air under pressure through said blower.

3. The combination in a reversible multi-cylinder engine having a single air duct common to its cylinders, and control means for the engine, of a reversible positive displacement rotary blower connected with the air duct and a reversible power transmission mechanism between the engine and the blower, a turbo supercharger operated by kinetic energy of exhaust gas from the engine mounted directly on and supplying air under pressure to the blower, and means actuated by said control means for reversing the directional entry and flow of air through the blower to said duct.

4. The combination in a reversible multi-cylinder engine having at one side a single air duct common to its cylinders, and at its opposite side an exhaust manifold or manifolds communicating with the cylinders, of a positive displacement rotary blower arranged transversely of the longitudinal axis of the engine and connected with said duct, an exhaust turbo-supercharger connected with said manifold and mounted diagonally upon the blower to supply air under pressure to said blower, reversible transmission mechanism between the engine and the blower, control means for the engine, and means actuated by said control means for reversing the directional entry to and flow of air currents through said blower.

5. The combination in a reversible multi-cylinder engine having a single air duct extending longitudinally of and common to its cylinders, and control means for the engine, of an engine operated reversible rotary blower mounted transversely of and forming an integral part of the engine, and means within the blower actuated by said control means for reversing the direction entry to and flow of air currents under pressure through said blower to the air duct.

6. The combination in a reversible multi-cylinder engine having a single air duct common to its cylinders, and control means for the engine, of a reversible rotary blower communicating with said duct, a train of gears located between said blower and an end cylinder, an engine shaft and a gear on said shaft forming a flexible coupling with said train of gears, and means within the blower actuated by said control means for reversing the direction entry to and flow of air currents under pressure through said blower to the duct.

7. The combination in a reversible multi-cylinder engine having a single air duct common to its cylinders, and control means for the engine, of an engine-operated reversible rotary blower forming an integral part of the engine, and spaced valves within the blower actuated by said control means for reversing the direction-entry to and flow of air currents under pressure through said blower to said duct.

8. The combination in a multi-cylinder two cycle internal engine having a positive displacement rotary blower, means for constantly charging the cylinders with compressed air from said blower, and power transmission mechanism between said engine and said blower, of an exhaust supercharger mounted on and supplying compressed air directly to said blower, and an exhaust manifold between said cylinders and the exhaust supercharger, whereby kinetic energy in the exhaust gas is utilized in charging the cylinders and imparting power to the engine.

9. The combination in a multi-cylinder two cycle internal combustion engine having a positive displacement rotary blower, means for constantly charging the engine cylinders with compressed air from said blower, a crank shaft, and a train of gears providing power transmission mechanism between the blower and shaft, of an exhaust rotary turbo-supercharger mounted in position to supply compressed air directly to said blower, and an exhaust manifold between the engine cylinders and supercharger, whereby kinetic energy in the exhaust gas is utilized in charging the cylinders and imparting power to the crank shaft.

10. The combination in a multi-cylinder two cycle reversible internal combustion engine having a reversible rotary blower, means for constantly charging the engine cylinders with compressed air from said blower, a crank shaft, and a train of gears providing reversible power transmission mechanism between the blower and the shaft, of an exhaust turbo-supercharger supplying compressed air directly to said blower, and an exhaust manifold connecting said cylinders and supercharger, whereby kinetic energy of the exhaust gas is utilized in charging the cylinders and imparting power to the crank shaft.

11. The combination in a multi-cylinder two cycle internal combustion engine having a positive displacement rotary blower, means for constantly charging the cylinders with compressed air from the blower, and power transmission mechanism between the engine and the blower, of an exhaust-gas operated supercharger adapted to deliver compressed air to the inlet side of the blower, whereby kinetic energy of exhaust gas is utilized in charging the cylinders and imparting power to the engine.

12. The combination in a multi-cylinder two cycle internal combustion engine having a positive displacement rotary blower, means for constantly charging the cylinders with compressed air from the blower, and power transmission mechanism between the engine and the blower, of an exhaust-gas operated turbo-supercharger having a rotary air-impeller adapted to deliver compressed air to the inlet side of the blower, whereby kinetic energy of exhaust gas is utilized in charging the cylinders and imparting power to the engine.

13. The combination in a multi-cylinder two cycle internal combustion engine having a positive displacement blower for supplying air under comparatively low pressure to its cylinders, and power transmission mechanism between the engine and blower, of an exhaust-gas operated supercharger for delivering compressed air to the inlet side of the blower, thereby boosting the air pressure supplied to the cylinders and imparting power to the engine.

FRANK B. YINGLING.